R. R. JOHNSTON.
GRAIN SEPARATOR.
APPLICATION FILED MAR. 24, 1916. RENEWED NOV. 19, 1918.
1,308,496.
Patented July 1, 1919.
2 SHEETS—SHEET 1.
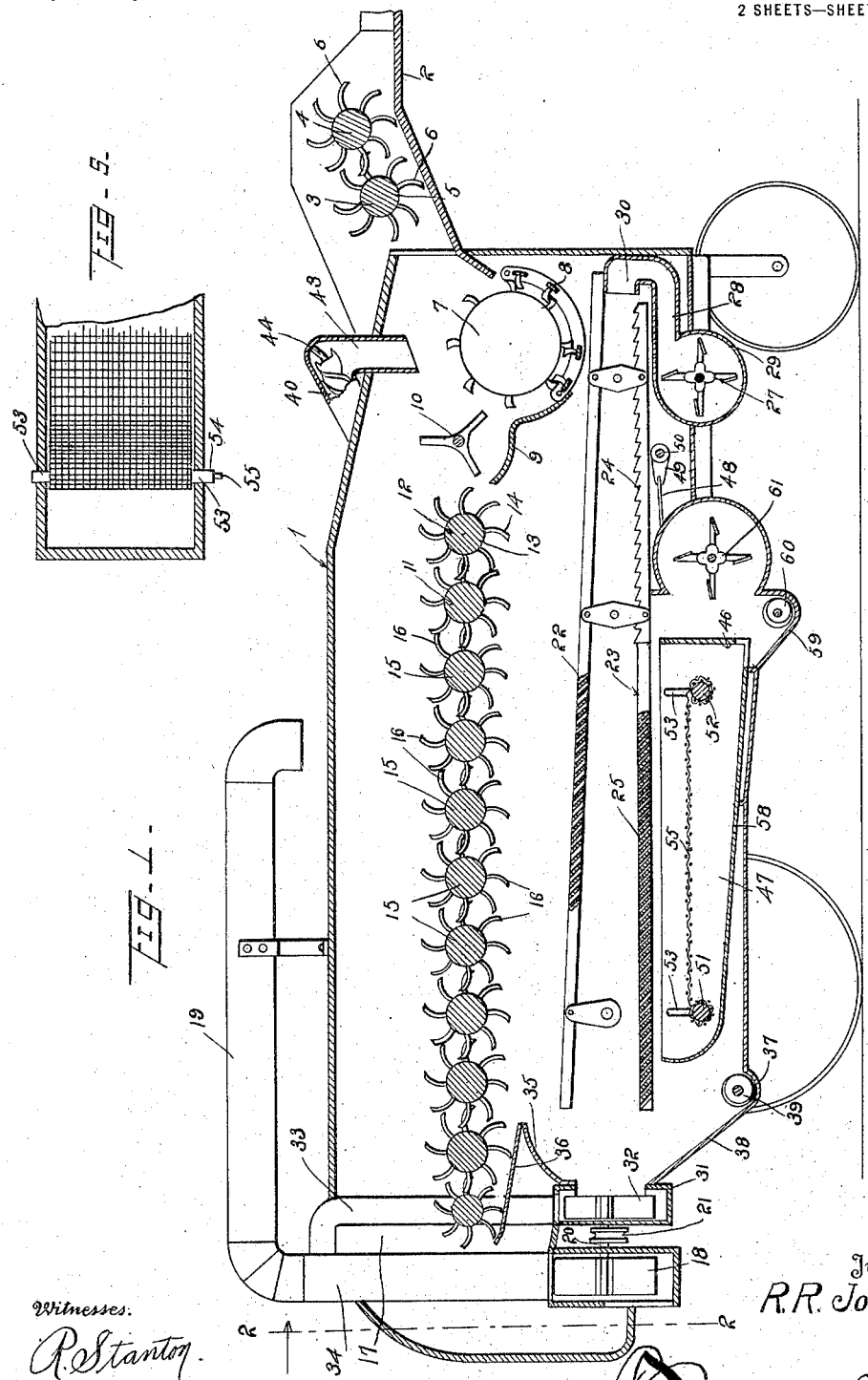
Witnesses.
R. Stanton.
Rohe Meyer.
Inventor
R. R. Johnston.
By
Attorney

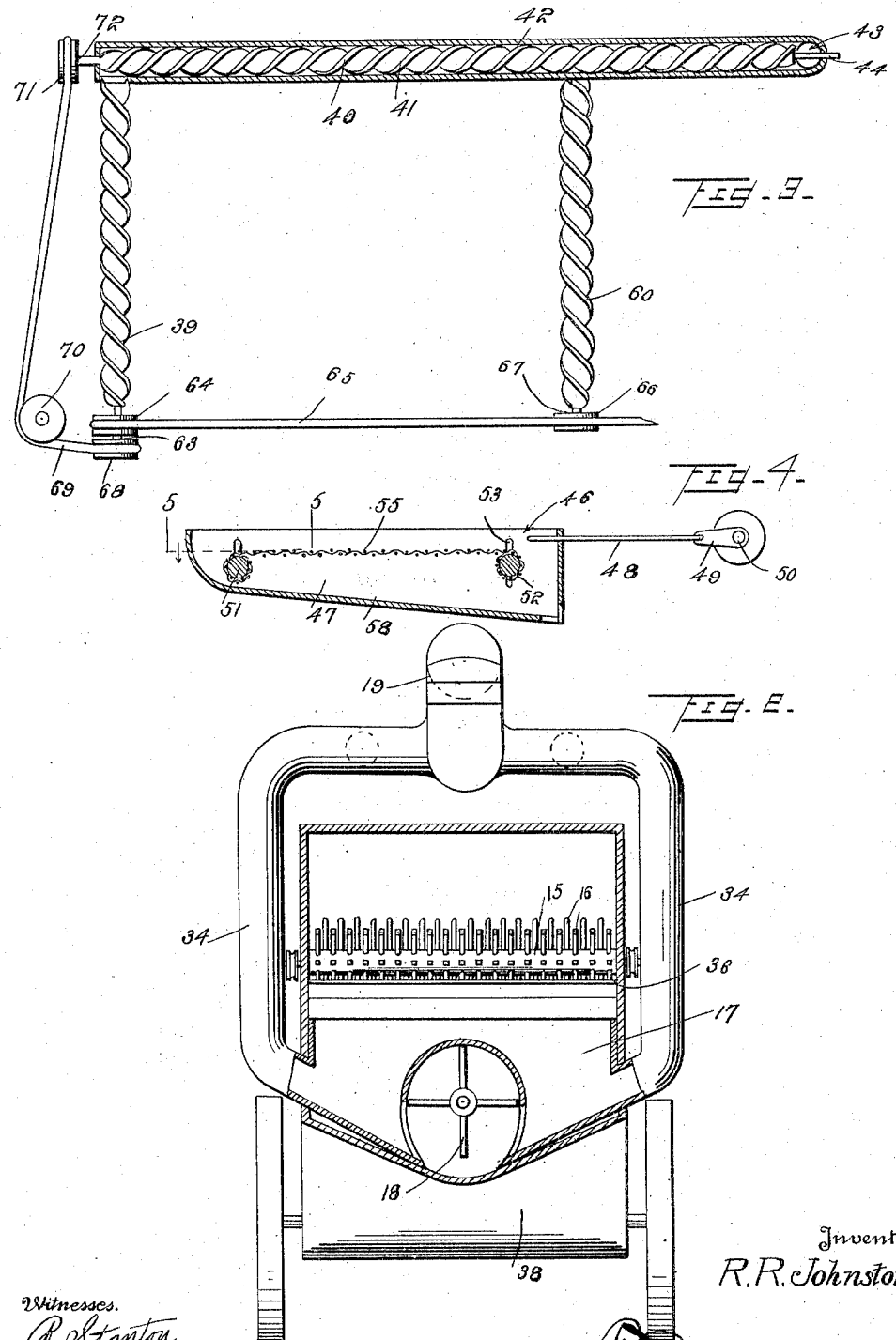

UNITED STATES PATENT OFFICE.

ROY R. JOHNSTON, OF COSMOPOLIS, WASHINGTON.

GRAIN-SEPARATOR.

1,308,496.  Specification of Letters Patent.  Patented July 1, 1919.

Application filed March 24, 1916, Serial No. 86,400. Renewed November 19, 1918. Serial No. 263,235.

*To all whom it may concern:*

Be it known that I, ROY R. JOHNSTON, a citizen of the United States, residing at Cosmopolis, in the county of Grays Harbor and State of Washington, have invented certain new and useful Improvements in Grain-Separators; and I do hereby declare the following to be a full, clear, and exact description of the invention, such as will enable others skilled in the art to which it appertains to make and use the same.

This invention relates to grain separators or threshers, and the primary object of the invention is to provide a separator which is constructed for doing a maximum amount of work, with a relatively small machine, and still have an efficient separation of the grain from the straw, and further to provide a grain separator wherein the cleaning or separating of the grain is started directly after the grain leaves the cylinders.

Another object of this invention is to provide a grain separator as specified which includes a plurality of rotary straw carrying members each of which is provided with a plurality of radiating arcuate teeth. The teeth upon one of the rotary straw carriers are disposed staggeredly to the teeth upon the straw carrier next thereto, and these teeth pass between the teeth upon the straw carrier next thereto during the operation of the separator.

A further object of this invention is to provide a separator structure as specified which includes a novel construction of chaffers and grain pans, for efficiently separating the grain from the chaff and to provide means for blowing a blast of air between the upper chaffer and the lower chaffer and grain pans for blowing chaff and dirt out of the wheat or grain.

A further object of this invention is to provide a sieve structure in the separator which includes a pair of rollers having a sieve mounted thereon and extending from one roller to the other, which sieve is constructed of flexible material, portions of which sieve have larger mesh than other portions, so that the necessity of removing a sieve from the separator and replacing it by a sieve having a larger or smaller mesh is unnecessary, in that the sieve may be rolled from one roller to the other until the portion having the proper mesh is positioned for receiving the grain.

A still further object of this invention is to provide a chaff blower and a straw blower, which have different fans and which communicate with a single blower pipe through which the straw and chaff is blown.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a longitudinal section through the improved grain separator,

Fig. 2 is a vertical section on the line 2—2 of Fig. 1,

Fig. 3 is a fragmentary horizontal section showing the arrangement of the grain and tailings auger, Fig. 4 is a detail sectional view illustrating the sieve, and Fig. 5 is a fragmentary plan view of the rotary straw carrying structure.

Referring more particularly to the drawings, 1 designates the casing of the improved grain separator as an entirety, which consists of the usual construction and has a feed board 2 leading to the mouth of the same. A pair of rotary feeders 3 and 4 are provided, which facilitate in feeding the grain into the separator. The feeders 3 and 4 comprise rollers 5 which have a plurality of radiating arcuate fingers 6 formed thereon for engaging the grain and feeding it into the casing 1, and to the cylinder 7. The cylinder 7 of the thresher is of the usual construction, and it coöperates with a concave structure 8, also of the ordinary construction used in threshers. The grain travels over the concave 8, and a grate or extension 9 formed thereon, where it is engaged by a rotary beater 10. The rotary beater 10 is of the usual type employed in grain separators.

Positioned slightly below the rotary beater 10 and extending rearwardly therefrom, are a plurality of rotary straw carriers generically indicated by the numeral 11. The first of the rotary straw carriers 11, which is indicated by the numeral 12 and receives the grain from the feeder 10, includes a roller 13 which has a plurality of radiating arcuate fingers 14 connected thereto. The rollers 15 of the rotary straw carriers have arcuate radially extending fingers 16 formed thereon, as clearly shown in Fig. 1 of the drawings, and the fingers 16 carried by one of the rollers 15 are disposed staggeredly with respect to the fingers formed upon the rollers next thereto, so as to permit the fingers to pass during the rotation of the various rotary straw carriers 11. The straw passes over the series of rotary straw carriers, which are geared so that each of the rotary straw carriers will rotate slightly faster than the one forwardly of the same.

The straw is thrown by the last of the rotary straw carriers into a housing 17, which is positioned at the rear end of the separator, and has a rotary blast fan 18 positioned in its lower end, for blowing the straw upwardly and into an ordinary blower pipe 19. The rotary fan 18 is mounted upon a shaft 20, which is propelled through the medium of a pulley 21 mounted thereon, and a cable which passes over this pulley.

The grain or berries of the wheat or analogous grain and the chaff are carried downwardly by the rotation of the rotary straw carriers 15 and deposited upon a vibratory chaffer 22. The grain falls from the chaffer 22 upon a combination grain pan chaffer and chaffer extension structure 23 which is positioned therebeneath, and comprises a grain pan structure 24, a chaffer structure 25, all of which are of the ordinary construction employed in certain types of grain separators.

A rotary blast fan 27 is carried by the frame 1 and is positioned beneath the forward end of the grain pan 24. A spout 28 communicates with the casing 29 which incloses the fan 27, and this spout has its delivery end positioned between the chaffer 22 and the grain pan 24 as shown at 30, for blowing a blast of air between these members for blowing dust and fine particles of chaff or the like out of the wheat or grain.

The chaff passes from the chaffer 22 and the chaffer extension 26, into a chaff receiving casing 31 in which is mounted a rotary blast fan 32. The fan 32 is mounted upon the shaft 20 and rotates synchronously with the rotation of the fan 18. Branch blower pipes 33 communicate with the casing 31 and with the pipe 34 which leads from the receptacle 17 to the blower 19. A deflecting plate 35 is positioned within the separator body 1 and is shaped for guiding the chaff from the chaffer 22 into the receptacle 31. A guiding plate 36 is also positioned within the body 1 and has its forward end connected to the upper forward end of the plate 35. The plate 36 is provided for facilitating and guiding the passage of the straw into the receptacle 17.

A trough 37 is formed in the lower portion of the casing adjacent its rear end, and the bottom of the casing 1 inclines toward the trough as shown at 38. An auger 39 is positioned in the trough 37, and this auger is provided for carrying the tailings transversely across the separator and delivering them to the tailing elevator 40. The tailing elevator 40 comprises an auger 41, which rotates in a casing 42. The upper end of the casing 42 curves downwardly as shown at 43 and delivers the tailings to the rotary cylinder 7. A member 44 is positioned within the curved portion 43 of the tailing elevator trough 42 and is provided for preventing cylinder teeth, rods or other foreign articles from falling into the cylinder from the tailing elevator.

The grain or berries fall from the chaffer 22 into the cleaning sieve structure 46, which includes a casing 47 which is mounted for vibratory movement longitudinally of the separator. The casing or shoe 47 has a rod 48 connected thereto, which rod is in turn pivotally connected to an arm 49. The arm 49 is mounted upon a shaft 50, so that upon rotation of the shaft the casing 47 will be reciprocated longitudinally of the frame 1 of the separator.

A pair of rollers 51 and 52 are mounted within the casing or shoe 47 and are adjustable vertically, through the provision of slots 53, in which the ends of the supporting shaft of the rollers are mounted. The supporting shaft 54 of the rollers 51 and 52 project through the shoe 47 and may have their outer ends 55 cut rectangularly for mounting a crank handle thereon for rotating the rollers, for winding the sieve or screen 55 from one roller to the other. The screen or sieve 55 which is rolled upon the rollers 51 and 52 and extends from one roller to the other, is divided into sections, the mesh of which sections differ, as shown at 56 and 57 in Fig. 5 of the drawings. This is to permit of the adjusting of the sieve, as necessary during the threshing of grain, without necessitating the changing of one sieve and replacing it with another, or without incurring the liability of the bending of the lips, when an adjustable riddle screen or sieve is employed, and the screen or sieve may be adjusted by simply rotating one or the other of the rollers 51 or 52.

The grain after falling through the sieve 55 travels over the upper surface of the inclined bottom 58 of the casing 47, and into a trough 59. A grain auger 60 is positioned in the trough 59, and carries the grain to the sacks or any suitable retaining receptacle. A rotary fan 61 is positioned so that a blast of air will be forced through the casing 47.

In operating the various parts of the separator, cables are employed in connection with sheave pulleys, which eliminate the necessity of relacing a belt or changing the belt under different weather conditions.

In Fig. 3 of the drawings, the shaft 63 which propels the tailing auger 39 has a sheave pulley 64 mounted thereon about which a cable 65 travels. The cable 65 also travels about a sheave pulley 66 which is mounted upon the shaft 67 employed for operating the grain auger 60. The shaft 63 also has a sheave pulley 68 mounted thereon about which the cable 69 passes. The cable 69 passes about an idler sheave pulley 70 and about a sheave pulley 71 which is mounted upon the shaft 72. The shaft 72 is employed for rotating the tailing elevating auger 41. All of the various operating parts of the separator are properly geared and connected through the medium of sheave pulleys and cables in a proper manner for insuring their efficient operation.

Summing up the operation of the improved grain separator is as follows: The unthreshed grain is placed upon the feeding table 2, where it is engaged by the rotary feeders 3 and 4 and carried inwardly to the cylinder 7. The cylinder 7 rotating, above the concave 8, will beat the grain as is ordinary in the operation of rotary threshing cylinders, and the grain will pass over the grate or extension 9 where it will be engaged by the rotary beater 10. The straw and grain will be received from the beater 10 and the grate or extension 9 by the rotary straw carrier 12 which will in turn deliver the straw to the series of rotary straw carriers 11. The rotary straw carriers 11 will carry the straw rearwardly through the entire length of the separator and deposit the straw in the receptacle 17, out of which it will be blown by the operation of the blast fan 18 through the blower 19. The grain berries and chaff will fall downwardly between the rotary straw carriers 11 upon the chaffer 22, and from them on to the chaffer extension structure 23 as is ordinary in grain separators. The chaff will pass off of the chaffers 22 and 25 into the casing 31 out of which it will be blown by the operation of the blast fan 32, through the branch blower pipe 33 into the blower pipe 19. The tailings will be carried by the auger 39 across to the tailing elevator 40 which will elevate them and deposit them in the thresher directly above the rotary cylinder 7 for retravel through the machine. The threshed grain travels downwardly on to the sieve 55, which sieves the grain, and the grain will travel over the upper inclined surface of the bottom 58 of the shoe 46 into the grain auger 60 which will carry the grain to sacks or analogous retaining receptacles.

From the foregoing description taken in connection with the accompanying drawings, the advantages of construction and of the method of operation of the improved grain separator will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a grain separator structure, the combination, with a separator including a casing, of a straw retaining housing positioned at the rear end of the separator and having its bottom inclining downwardly to the longitudinal center thereof, a fan casing extending upwardly from the center of said bottom, a fan in said casing rotatable transversely to the direction of feed of straw through the separator, a blower pipe, a branch pipe communicating with said housing at the bottom thereof and extending upwardly along one side of the separator casing, said branch pipe communicating with said blower pipe, said fan casing provided with an opening alining with the communicating opening between said housing and said branch pipe.

In testimony whereof I affix my signature in presence of two witnesses.

ROY R. JOHNSTON.

Witnesses:
G. A. SOULE,
WILLIAM LEACH.

Copies of this patent may be obtained for five cents each, by addressing the "Commissioner of Patents, Washington, D. C."